(12) United States Patent
Hasegawa (10) Patent No.: US 9,941,499 B2
(45) Date of Patent: Apr. 10, 2018

(54) NONAQUEOUS ELECTROLYTE SECONDARY BATTERY SEPARATOR, NONAQUEOUS ELECTROLYTE SECONDARY BATTERY LAMINATED SEPARATOR, NONAQUEOUS ELECTROLYTE SECONDARY BATTERY MEMBER, AND NONAQUEOUS ELECTROLYTE SECONDARY BATTERY

(71) Applicant: Sumitomo Chemical Company, Limited, Tokyo (JP)

(72) Inventor: Hirohiko Hasegawa, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/359,982

(22) Filed: Nov. 23, 2016

(65) Prior Publication Data

US 2017/0155109 A1 Jun. 1, 2017

(30) Foreign Application Priority Data

Nov. 30, 2015 (JP) ................................ 2015-233931

(51) Int. Cl.
| | | |
|---|---|---|
| H01M 2/16 | (2006.01) | |
| H01M 10/05 | (2010.01) | |
| H01M 2/14 | (2006.01) | |

(52) U.S. Cl.
CPC ......... *H01M 2/1653* (2013.01); *H01M 10/05* (2013.01); *H01M 2/145* (2013.01)

(58) Field of Classification Search
CPC .. H01M 2/1653; H01M 2/1686; H01M 2/145; H01M 10/0525; H01M 2220/30
See application file for complete search history.

(56) References Cited

U.S. PATENT DOCUMENTS

| | | | |
|---|---|---|---|
| 4,588,633 A | 5/1986 | Kono et al. | |
| 4,873,034 A | 10/1989 | Kona et al. | |
| 5,683,634 A | 11/1997 | Fujii et al. | |
| 6,824,865 B1 | 11/2004 | Funaoka et al. | |
| 2002/0034689 A1 | 3/2002 | Hoshida et al. | |
| 2010/0178544 A1 | 7/2010 | Nishikawa | |
| 2010/0227223 A1* | 9/2010 | Noumi .................. | B29C 55/005 429/254 |
| 2011/0064990 A1 | 3/2011 | Mohr et al. | |
| 2012/0115008 A1 | 5/2012 | Sano et al. | |
| 2012/0129034 A1 | 5/2012 | Hasegawa et al. | |
| 2013/0011744 A1 | 1/2013 | Takata et al. | |
| 2013/0089772 A1* | 4/2013 | Nishikawa ............ | H01M 2/162 429/145 |
| 2014/0161967 A1 | 6/2014 | Hasegawa et al. | |
| 2014/0178741 A1 | 6/2014 | Hasegawa et al. | |
| 2014/0302389 A1 | 10/2014 | Hasegawa et al. | |
| 2014/0349168 A1 | 11/2014 | Yashiki et al. | |
| 2015/0004466 A1 | 1/2015 | Yashiki et al. | |
| 2015/0280195 A1* | 10/2015 | Schmitz .................. | C08L 23/12 429/145 |
| 2016/0149182 A1* | 5/2016 | Zhang .................. | H01M 2/1653 429/145 |
| 2017/0229696 A1 | 8/2017 | Hasegawa et al. | |
| 2017/0279102 A1 | 9/2017 | Hasegawa et al. | |

FOREIGN PATENT DOCUMENTS

| | | |
|---|---|---|
| CN | 102471518 A | 5/2012 |
| CN | 103687675 A | 3/2014 |
| CN | 103718338 A | 4/2014 |
| CN | 103946023 A | 7/2014 |
| CN | 104093775 A | 10/2014 |
| JP | 60-242035 | 12/1985 |
| JP | S63-273651 A | 11/1988 |
| JP | H07-29563 A | 1/1995 |
| JP | 10-261393 | 9/1998 |
| JP | 2002-69221 | 3/2002 |
| JP | 2003-103626 A | 4/2003 |
| JP | 2009-256404 A | 11/2009 |
| JP | 2010-092717 A | 4/2010 |
| JP | 2011-224987 A | 11/2011 |
| JP | 4814392 B1 | 11/2011 |
| JP | 2015-105365 A | 6/2015 |
| JP | 2015-198164 A | 11/2015 |
| JP | 2015-221861 A | 12/2015 |
| KR | 2010-0025568 A | 3/2010 |
| KR | 2011-0009126 A | 1/2011 |
| KR | 2012-0031236 A | 3/2012 |
| WO | 2000/20492 A1 | 4/2000 |
| WO | 2011/016571 A1 | 2/2011 |

* cited by examiner

OTHER PUBLICATIONS

Office Action issued Apr. 19, 2016 in JP Application No. 2015-233931.
Office Action issued Jul. 18, 2016 in KR Application No. 10-2016-0064606.
Decision to Grant issued Aug. 31, 2016 in KR Application No. 10-2016-0064606.
Office Action dated Dec. 11, 2017 in CN Application No. 201611077527.X.

*Primary Examiner* — Raymond Alejandro
(74) *Attorney, Agent, or Firm* — Panitch Schwarze Belisario & Nadel LLP (57) ABSTRACT

Provided is a nonaqueous electrolyte secondary battery separator that has (i) an excellent ion permeability and (ii) reduced occurrence of a leak defect despite a small thickness. The nonaqueous electrolyte secondary battery separator includes a porous film containing polyolefin as a main component, the nonaqueous electrolyte secondary battery separator having a Gurley value within a range of 50 sec/100 cc to 200 sec/100 cc, the nonaqueous electrolyte secondary battery separator having a thickness within a range of 3 μm to 16 μm, the nonaqueous electrolyte secondary battery separator satisfying $0.85 \leq ((S_{MD}/S_m)+(S_{TD}/S_m))/2 \leq 0.91$.

6 Claims, 3 Drawing Sheets

NONAQUEOUS ELECTROLYTE SECONDARY BATTERY SEPARATOR, NONAQUEOUS ELECTROLYTE SECONDARY BATTERY LAMINATED SEPARATOR, NONAQUEOUS ELECTROLYTE SECONDARY BATTERY MEMBER, AND NONAQUEOUS ELECTROLYTE SECONDARY BATTERY

CROSS-REFERENCE TO RELATED APPLICATIONS

This Nonprovisional application claims priority under 35 U.S.C. § 119 on Patent Application No. 2015-233931 filed in Japan on Nov. 30, 2015, the entire contents of which are hereby incorporated by reference.

TECHNICAL FIELD

The present invention relates to a separator for a nonaqueous electrolyte secondary battery (hereinafter referred to as a "nonaqueous electrolyte secondary battery separator"), a laminated separator for a nonaqueous electrolyte secondary battery (hereinafter referred to as a "nonaqueous electrolyte secondary battery laminated separator"), a member for a nonaqueous electrolyte secondary battery (hereinafter referred to as a "nonaqueous electrolyte secondary battery member"), and a nonaqueous electrolyte secondary battery.

BACKGROUND ART

Nonaqueous electrolyte secondary batteries, particularly lithium secondary batteries, have a high energy density and are thus in wide use as batteries for personal computers, mobile telephones, portable information terminals, and the like.

Nonaqueous electrolyte secondary batteries, typically lithium secondary batteries, let a large current flow and thus generate intense heat in the event of an accident such as a breakage of the battery or a breakage of the device using the battery has caused an internal short circuit or external short circuit. Nonaqueous electrolyte secondary batteries are thus required to prevent more than a certain level of heat generation to ensure a high level of safety.

Such a high level of safety is ensured typically by a method of imparting to the nonaqueous electrolyte secondary battery a shutdown function, which is a function of a separator blocking passage of ions between the anode and the cathode in the event of abnormal heat generation to prevent further heat generation. The shutdown function may be imparted to a separator by, for example, a method of using, as the separator, a porous film made of a material that is meltable in the event of abnormal heat generation. A battery including such a separator allows the porous film to be melted and made non-porous in the event of abnormal heat generation to block the ion passage for prevention of further heat generation.

An example separator having the shutdown function is a porous film made of polyolefin. Such a porous film (separator) is melted and made non-porous at a temperature of approximately 80° C. to 180° C. in the event of abnormal heat generation by the battery to block (shutdown) the ion passage for prevention of further heat generation. There have been proposed various methods for producing a polyolefin porous film having the shutdown function (see Patent Literatures 1 to 3).

CITATION LIST

Patent Literature

[Patent Literature 1]
  Japanese Patent Application Publication, Tokukaishou, No. 60-242035 A (Publication Date: Dec. 2, 1985)
[Patent Literature 2]
  Japanese Patent Application Publication, Tokukaihei, No. 10-261393 A (Publication Date: Sep. 29, 1998)
[Patent Literature 3]
  Japanese Patent Application Publication, Tokukai, No. 2002-69221 A (Publication Date: Mar. 8, 2002)

SUMMARY OF INVENTION

Technical Problem

Figure 4:
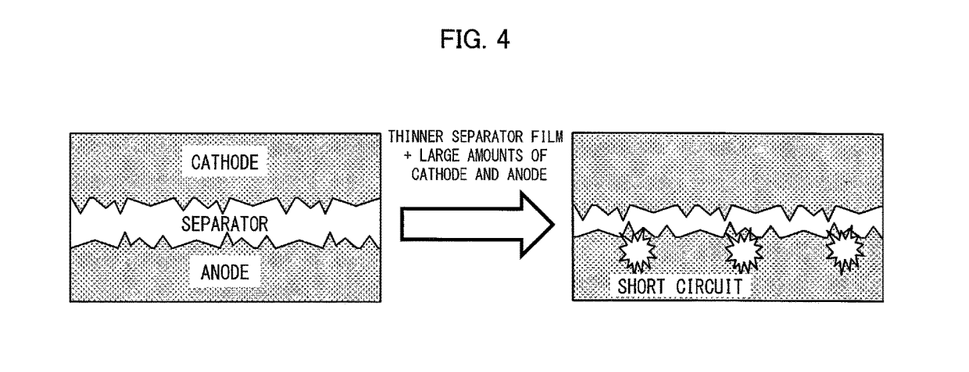
FIG. 4 is a diagram schematically illustrating how a thinner separator leads to a leak defect.

Lithium secondary batteries have an increasingly wider range of applications, and are thus required to have a higher energy density. The energy density of a battery may be increased simply by a method of reducing the thickness of the separator and increasing the respective amounts of the anode and the cathode accordingly. This method is, however, problematic in that as illustrated in FIG. 4, the bumps of the cathode and anode damage the separator heavily and decrease the insulation as the intended function, with the result of more leak defects early during the battery assembly. Decreasing the porosity of the separator will prevent the occurrence of a leak defect, but will decrease the ion permeability at the same time.

The present invention has been accomplished in view of the above problem. It is an object of an embodiment of the present invention to provide a nonaqueous electrolyte secondary battery separator, a nonaqueous electrolyte secondary battery laminated separator, a nonaqueous electrolyte secondary battery member, and a nonaqueous electrolyte secondary battery each of which has (i) an excellent ion permeability and (ii) reduced occurrence of a leak defect despite a small thickness.

Solution to Problem

The inventor of the present invention has uniquely discovered a correlation between (i) the difference in melting behavior between the porous film under tension and the porous film under no tension and (ii) the rate of occurrence of a leak defect. The inventor of the present invention has consequently completed the present invention.

A nonaqueous electrolyte secondary battery separator in accordance with an embodiment of the present invention is a nonaqueous electrolyte secondary battery separator including a porous film containing polyolefin as a main component, the nonaqueous electrolyte secondary battery separator having a Gurley value within a range of 50 sec/100 cc to 200 sec/100 cc, the nonaqueous electrolyte secondary battery separator having a thickness within a range of 3 μm to 16 μm, the nonaqueous electrolyte secondary battery separator satisfying Formula (1) below:

$$0.85 \le ((S_{MD}/S_m)+(S_{TD}/S_m))/2 \le 0.91 \quad \text{Formula (1),}$$

where $S_m$ is an area of a peak of a sheet-stack DSC curve, which is a DSC curve that shows a result of measurement for a stack of pieces each cut out from the porous film and having a predetermined size, $S_{MD}$ is an area of a portion at which the peak of the sheet-stack DSC curve overlaps a peak of a DSC curve that shows a result of measurement for a sample that has been (i) cut out from the porous film into a shape of a strip having a length of 50 mm and a longitudinal direction along an MD direction and (ii) wound around an aluminum plate having a width of 1.5 mm and a thickness of 0.1 mm so as to have 14 to 16 turns, and $S_{TD}$ is an area of a portion at which the peak of the sheet-stack DSC curve overlaps a peak of a DSC curve that shows a result of measurement for a sample that has been (i) cut out from the porous film into a shape of a strip having a length of 50 mm and a longitudinal direction along a TD direction and (ii) wound around an aluminum plate having a width of 1.5 mm and a thickness of 0.1 mm so as to have 14 to 16 turns.

A nonaqueous electrolyte secondary battery laminated separator in accordance with an embodiment of the present invention is a nonaqueous electrolyte secondary battery laminated separator, including: the nonaqueous electrolyte secondary battery separator; and a porous layer.

A nonaqueous electrolyte secondary battery member in accordance with an embodiment of the present invention is a nonaqueous electrolyte secondary battery member, including: a cathode; the nonaqueous electrolyte secondary battery separator or the nonaqueous electrolyte secondary battery laminated separator; and an anode, the cathode, the nonaqueous electrolyte secondary battery separator or the nonaqueous electrolyte secondary battery laminated separator, and the anode being arranged in this order.

A nonaqueous electrolyte secondary battery in accordance with an embodiment of the present invention is a nonaqueous electrolyte secondary battery, including: the nonaqueous electrolyte secondary battery separator or the nonaqueous electrolyte secondary battery laminated separator.

Advantageous Effects of Invention

An embodiment of the present invention produces the effect of having (i) an excellent ion permeability and (ii) the ability to reduce occurrence of a leak defect despite a small thickness.

DESCRIPTION OF EMBODIMENTS

The description below deals in detail with one embodiment of the present invention. The present invention is, however, not limited to such an embodiment. Further, the present invention is not limited to the description of the arrangements below, but may be altered in various ways by a skilled person within the scope of the claims. Any embodiment based on a proper combination of technical means disclosed in different embodiments is also encompassed in the technical scope of the present invention. In the present specification, any numerical range expressed as "A to B" means "not less than A and not more than B" unless otherwise stated.

[1. Separator]

(1-1) Nonaqueous Electrolyte Secondary Battery Separator

One embodiment of the present invention is a nonaqueous electrolyte secondary battery separator, which is a porous film to be disposed between the cathode and anode of a nonaqueous electrolyte secondary battery.

The porous film is simply a film-shaped, porous base material containing a polyolefin resin as a main component (polyolefin-based porous base material). The porous film has inside itself pores connected to one another, which allows a gas, a liquid, or the like to pass through from one surface to the other.

The porous film is, in a case where the battery generates excessive heat, melted to make the nonaqueous electrolyte secondary battery separator non-porous. The porous film thus imparts a shutdown function to the nonaqueous electrolyte secondary battery separator. The porous film may include a single layer or a plurality of layers.

The porous film has a thickness within a range of 3 μm to 16 μm, preferably within a range of 5 μm to 14 μm. This allows the thickness of the nonaqueous electrolyte secondary battery separator to be small and the amount(s) of the cathode and/or the anode to be increased accordingly, thereby helping increase the energy density.

The porous film has an air permeability with a Gurley value within a range of 50 sec/100 cc to 200 sec/100 cc, preferably within a range of 60 sec/100 cc to 180 sec/100 cc, for a sufficient ion permeability in use as an nonaqueous electrolyte secondary battery separator.

The porous film having a thickness within a range of 3 μm to 16 μm as described above can help increase the energy density of the nonaqueous electrolyte secondary battery, but at the same time, increases the likelihood of a leak defect. Further, the porous film having an air permeability with a Gurley value within a range of 50 sec/100 cc to 200 sec/100 cc allows for an excellent ion permeability, but at the same time, increases the likelihood of a leak defect due to a smaller amount of resin in the nonaqueous electrolyte secondary battery separator.

In view of that, the inventor of the present invention has diligently conducted research to uniquely discover a correlation between (i) the difference in melting behavior between the porous film under tension and the porous film under no tension and (ii) the rate of occurrence of a leak defect. The inventor of the present invention has consequently completed the present invention, an embodiment of which has a film thickness and an air permeability each within the above range and can reduce occurrence of a leak defect at the same time.

Specifically, the inventor of the present invention focused on the area of the peak corresponding to crystal fusion on a chart (hereinafter referred to as "DSC curves") that shows the result of differential scanning calorimetry (DSC), and defined a range for the proportion of (i) the area at which the peak of a DSC curve of the result of measurement under tension overlaps the peak of a DSC curve of the result of measurement under no tension to (ii) the area of the peak of the DSC curve of the result of measurement under no tension. The peak area of a DSC curve refers to the area of a region surrounded by (i) the DSC curve and (ii) a baseline, which is found from that portion of the DSC curve which is other than the peak.

Figure 1:
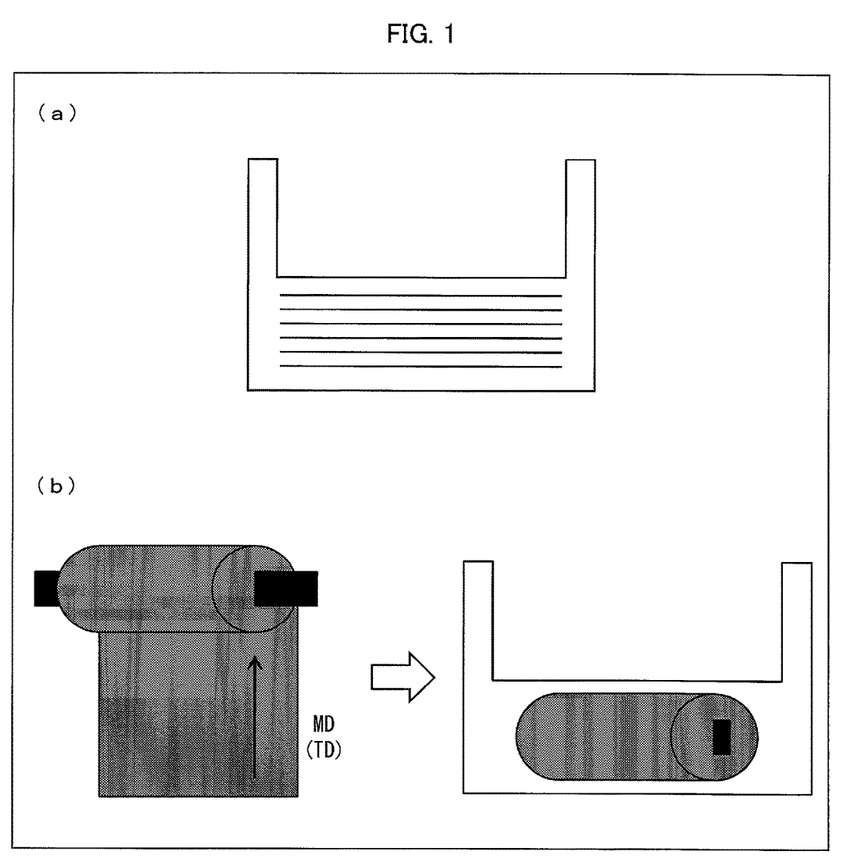
FIG. 1 provides diagrams each illustrating a method for preparing a DSC measurement sample.

The description below uses the symbol "$S_m$" to indicate the area of the peak of a DSC curve (hereinafter referred to as "sheet stack DSC curve") that shows the result of measurement for a case where a plurality of porous films have been cut out to each have a predetermined size and a stack of the plurality of porous films has been placed in an aluminum pan as illustrated in (a) of FIG. 1 (that is, under no tension). The description below uses the symbol "$S_{MD}$" to indicate the area at which the peak of the sheet-stack DSC curve overlaps the peak of a DSC curve (hereinafter referred to as "MD-wound DSC curve") that shows the result of measurement for a case where a porous film has been (i) cut out in a machine direction (MD) into the shape of a strip having a length of 50 mm, (ii) wound around an aluminum plate having a width of 1.5 mm and a thickness of 0.1 mm, and (iii) placed in an aluminum pan as illustrated in (b) of FIG. 1 (that is, under tension in the MD direction). The description below also uses the symbol "$S_{TD}$" to indicate the area at which the peak of the sheet-stack DSC curve overlaps the peak of a DSC curve that shows the result of measurement (hereinafter referred to as "TD-wound DSC curve") for a case where a porous film has been (i) cut out in a transverse direction (TD) into the shape of a strip having a length of 50 mm, (ii) wound around an aluminum plate having a width of 1.5 mm and a thickness of 0.1 mm, and (iii) placed in an aluminum pan (that is, under tension in the TD direction). The MD direction refers to the direction (longitudinal direction) in which the porous film is conveyed, whereas the TD direction corresponds the width direction (lateral direction) of the porous film.

A porous film in the shape of a strip is wound around an aluminum plate in such a manner that (i) the short sides of the porous film are parallel to the longitudinal direction of the aluminum plate and that (ii) the long sides of the porous film extend in a direction along which the porous film is conveyed to be wound around the aluminum plate. The porous film is wound in such a manner as not to suffer from plastic deformation and as to have 14 to 16 turns when the winding has completed.

The peak of an MD-wound DSC curve (or TD-wound DSC curve) overlaps the peak of a sheet-stack DSC curve at a portion at which the region surrounded by the baseline and the MD-wound DSC curve (or TD-wound DSC curve) overlaps the region surrounded by the baseline and the sheet-stack DSC curve.

The sheet-stack DSC curve and the MD-wound DSC curve (or TD-wound DSC curve) may have respective peaks different from each other in shape (that is, the melting behavior in the crystalline state) due to the difference in the measurement method. However, since the sheet-stack DSC curve and the MD-wound DSC curve (or TD-wound DSC curve) are obtained from porous films made of an identical raw material, there is no difference in the specific heat of each porous film between the crystalline state and non-crystalline state. The sheet-stack DSC curve and the MD-wound DSC curve (or TD-wound DSC curve) thus have respective shapes (flat portions) identical to and coincident with each other at portions preceding and following the peaks. Thus, respective baselines for the sheet-stack DSC curve and the MD-wound DSC curve (or TD-wound DSC curve) may be lines each connecting points which are on a portion (flat portion) of the sheet-stack DSC curve or the MD-wound DSC curve (or TD-wound DSC curve), the portion having no shape difference, and at which the sheet-stack DSC curve and the MD-wound DSC curve (or TD-wound DSC curve) coincide with each other (for example, 90° C. and 160° C. in FIG. 2 referred to later).

In a case where the range over which points are connected (that is, the respective positions of those coincident points) have been changed (for example, from 90° C. and 160° C. to 60° C. and 180° C.), the influence on the ratios of $S_{MD}/S_m$ and $S_{TD}/S_m$ will be extremely small and will be an ignorable error.

In a case where an MD-wound DSC curve and a TD-wound DSC curve are measured, a reference cell contains an aluminum plate identical to the above aluminum plate. This makes it possible to ignore the influence of the aluminum plate.

Figure 2:
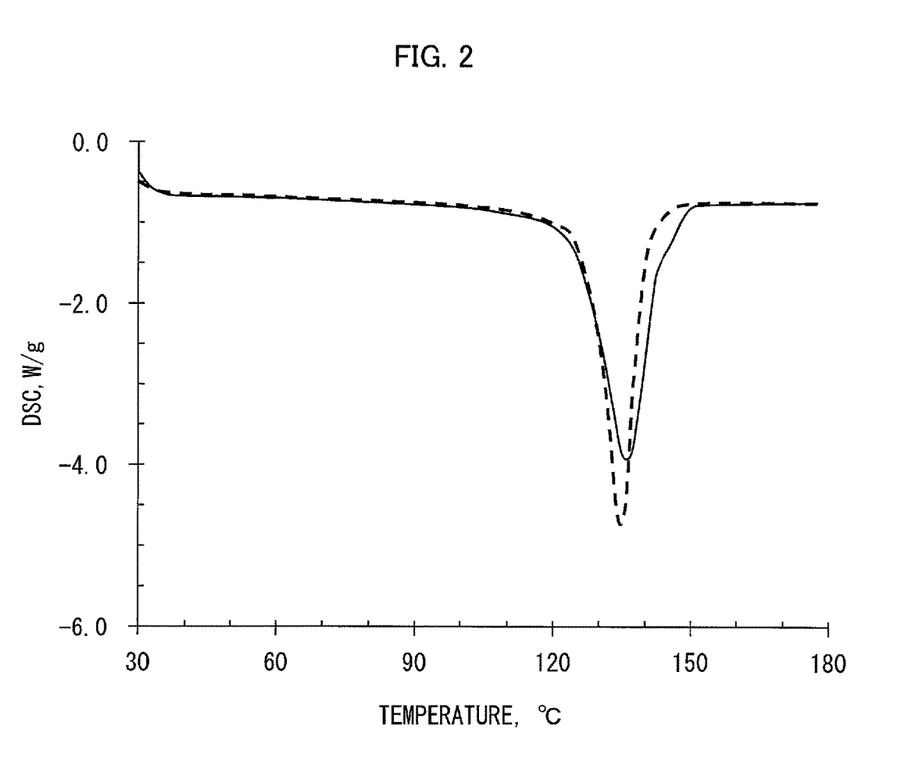
FIG. 2 is a graph that shows a difference of DSC curves for a porous film under tension and for the porous film under no tension.

FIG. 2 is a graph that shows (i) a solid line to indicate an MD-wound DSC curve, which shows the result of measurement under tension in the MD direction, and (ii) a dotted line to indicate a sheet-stack DSC curve, which shows the result of measurement under no tension. The example of FIG. 2 shows endothermic peaks within a range of 120° C. to 150° C., and also shows that the MD-wound DSC curve has a peak shifted to the high temperature side in comparison to the sheet-stack DSC curve, indicating a change in the melting behavior of the porous film which melting behavior is derived from the crystalline state of the porous film. It follows that the area $S_{MD}$, which is of a portion at which the respective peaks of the two DSC curves overlap each other, and the peak area $S_m$, which is of the sheet-stack DSC curve, have a ratio $S_{MD}/S_m$ indicative of a difference in melting behavior between the porous film under tension in the MD direction and the porous film under no tension. This applies similarly to a TD-wound DSC curve, which shows the result of measurement under tension in the TD direction: The TD-wound DSC curve has a peak shifted to the high temperature side in comparison to the sheet-stack DSC curve, and the ratio $S_{TD}/S_m$ thus indicates a difference in melting behavior between the porous film under tension in the TD direction and the porous film under no tension.

A porous film containing polyolefin as a main component has a crystal fusion peak within a range of 50° C. to 220° C. DSC can thus simply be performed within a temperature range covering the above range.

The porous film of the present embodiment satisfies the following formula:

$$0.85 \leq ((S_{MD}/S_m)+(S_{TD}/S_m))/2 \leq 0.91 \quad \text{Formula (1)}$$

A porous film that satisfies Formula (1) above has a low frequency of a leak defect as compared to a porous film that does not satisfy Formula (1). This has been confirmed by the Examples described below. Satisfying Formula (1) above can reduce occurrence of a leak defect. In particular, an embodiment of the present invention can produce its effects significantly in a case where Formula (1) above is satisfied by a porous film that has a thickness within a range of 3 μm to 16 μm and a Gurley value within a range of 50 sec/100 cc to 200 sec/100 cc and that tends to cause a leak defect.

The porous film contains a polyolefin component at a proportion of normally not less than 50% by volume, preferably not less than 90% by volume, more preferably not less than 95% by volume, of the entire porous film.

Examples of the polyolefin resin contained in the porous film include high-molecular-weight homopolymers and copolymers produced through polymerization of ethylene, propylene, 1-butene, 4-methyl-1-pentene, 1-hexene, and/or the like. The polyolefin resin is, among the above, preferably a high molecular weight polyethylene containing ethylene as a main component and having a weight-average molecular weight of not less than 1,000,000. The porous film may contain a component(s) other than a polyolefin as long as that component(s) does not impair the function of the layer(s) of the porous film(s).

The porous film has a volume-based porosity preferably within a range of 0.30 to 0.55 (30% by volume to 55% by volume), more preferably within a range of 0.35 to 0.50 (35% by volume to 50% by volume), in order to allow the porous film to (i) retain a larger amount of electrolyte solution and (ii) have the function (shutdown) of reliably preventing the flow of an excessively large current at a lower temperature.

The porous film has a weight per unit area normally within a range of 4 g/m² to 12 g/m², preferably within a range of 5 g/m² to 8 g/m², to increase the strength, the thickness, the handleability, and the weight of the porous film as well as the energy density per unit weight, the energy density per unit volume, and the like of a nonaqueous electrolyte secondary battery including the porous film.

The porous film containing a polyolefin resin as a main component may be produced by any method that allows the porous film to have a crystalline state in which the melting behavior differs depending on a measurement condition (that is, under tension or no tension) as described above. Examples of such a method include those methods that are disclosed in Patent Literatures 1 to 3 above. In particular, in a case of, for example, producing a porous film from a polyolefin resin containing (i) an ultra-high molecular weight polyethylene and (ii) a low molecular weight polyolefin having a weight-average molecular weight of not more than 10,000, such a porous film is, in terms of production costs, preferably produced by a method such as the method below.

The porous film may be produced by a method including a step of (i) kneading 100 parts by weight of an ultra-high molecular weight polyethylene, 5 parts by weight to 200 parts by weight of a low molecular weight polyolefin having a weight-average molecular weight of not more than 10,000, and 100 parts by weight to 400 parts by weight of a pore forming agent such as calcium carbonate or a plasticizer to prepare a polyolefin resin composition, a step of (ii) shaping the polyolefin resin composition into a sheet, a step of (iii) removing the pore forming agent from the sheet resulting from the step (ii), and a step of (iv) stretching the sheet resulting from the step (iii) to produce a porous film.

The above production method makes it possible to produce a porous film having $((S_{MD}/S_m)+(S_{TD}/S_m))/2$ that satisfies Formula (1) above, that is, a porous film having a crystalline state in which the melting behavior differs greatly depending on whether the porous film is under tension or no tension, by optimizing processing conditions such as (i) the mixing ratio of the polyolefin resin composition and (ii) sheet-shaping and stretching temperatures depending on the above mixing ratio and target film thickness.

(1-2) Nonaqueous Electrolyte Secondary Battery Laminated Separator

Another embodiment of the present invention may be a nonaqueous electrolyte secondary battery laminated separator including the above-described nonaqueous electrolyte secondary battery separator (porous film) and a porous layer. Since the porous film is as described above, the following description will discuss the porous layer alone.

The porous layer is disposed on one surface or both surfaces of the nonaqueous electrolyte secondary battery separator (porous film) as necessary. The porous layer preferably contains a resin that (i) has a function desired for the porous layer, that (ii) is insoluble in the electrolyte solution of the battery, and that (iii) is electrochemically stable when the battery is in normal use. In a case where the porous layer is disposed on one surface of the porous film, the porous layer is preferably on that surface of the porous film which faces the cathode of a nonaqueous electrolyte secondary battery to be produced, more preferably on that surface of the porous film which comes into contact with the cathode.

Specific examples of the resin include polyolefins such as polyethylene, polypropylene, polybutene, and ethylene-propylene copolymer; fluorine-containing resins such as polyvinylidene fluoride (PVDF) and polytetrafluoroethylene; fluorine-containing rubbers such as vinylidene fluoride-hexafluoro propylene copolymer, tetrafluoroethylene-hexafluoro propylene copolymer, tetrafluoroethylene-perfluoroalkyl vinyl ether copolymer, vinylidene fluoride-tetrafluoroethylene copolymer, vinylidene fluoride-trifluoro ethylene copolymer, vinylidene fluoride-trichloroethylene copolymer, vinylidene fluoride-vinyl fluoride copolymer, vinylidene fluoride-hexafluoropropylene-tetrafluoroethylene copolymer, and ethylene-tetrafluoroethylene copolymer; aromatic polyamides; fully aromatic polyamides (aramid resins); rubbers such as styrene-butadiene copolymer and a hydride thereof, methacrylic acid ester copolymer, acrylonitrile-acrylic acid ester copolymer, styrene-acrylic acid ester copolymer, ethylene propylene rubber, and polyvinyl acetate; resins with a melting point or glass transition temperature of not lower than 180° C. such as polyphenylene ether, polysulfone, polyether sulfone, polyphenylene sulfide, polyetherimide, polyamide imide, polyetheramide, and polyester; and water-soluble polymers such as polyvinyl alcohol, polyethyleneglycol, cellulose ether, sodium alginate, polyacrylic acid, polyacrylamide, and polymethacrylic acid.

Specific examples of the aromatic polyamides include poly(paraphenylene terephthalamide), poly(methaphenylene isophthalamide), poly(parabenzamide), poly(methabenzamide), poly(4,4'-benzanilide terephthalamide), poly(paraphenylene-4,4'-biphenylene dicarboxylic acid amide), poly(methaphenylene-4,4'-biphenylene dicarboxylic acid amide), poly(paraphenylene-2,6-naphthalene dicarboxylic acid amide), poly(methaphenylene-2,6-naphthalene dicarboxylic acid amide), poly(2-chloroparaphenylene terephthalamide), paraphenylene terephthalamide/2,6-dichloroparaphenylene terephthalamide copolymer, and methaphenylene terephthalamide/2,6-dichloroparaphenylene terephthalamide copolymer. Among these, poly(paraphenylene terephthalamide) is preferable.

Among the above resins, a polyolefin, a fluorine-containing resin, an aromatic polyamide, and a water-soluble polymer are preferable. In particular, in the case where the porous layer is so disposed as to face the cathode, the porous layer more preferably contains a fluorine-containing resin or a fluorine-containing rubber, even more preferably a polyvinylidene fluoride-based resin (for example, a homopolymer of vinylidene fluoride [that is, polyvinylidene fluoride] or a copolymer of (i) vinylidene fluoride and (ii) hexafluoropropylene, tetrafluoroethylene, trifluoro ethylene, trichloroethylene, or vinyl fluoride), to facilitate maintaining various performance capabilities of the nonaqueous electrolyte secondary battery such as the rate characteristic and resistance characteristic (solution resistance) even in a case where the battery suffers from acidic deterioration while being charged or discharged.

The porous layer may contain a filler. The porous layer for an embodiment of the present invention may contain a filler made of organic matter or a filler made of inorganic matter. Specific examples of the filler made of organic matter include fillers made of (i) a homopolymer of a monomer such as styrene, vinyl ketone, acrylonitrile, methyl methacrylate, ethyl methacrylate, glycidyl methacrylate, glycidyl acrylate, or methyl acrylate, or (ii) a copolymer of two or more of such monomers; fluorine-containing resins such as polytetrafluoroethylene, ethylene tetrafluoride-propylene hexafluoride copolymer, tetrafluoroethylene-ethylene copolymer, and polyvinylidene fluoride; melamine resin; urea resin; polyethylene; polypropylene; and polyacrylic acid and polymethacrylic acid. Specific examples of the filler made of inorganic matter include fillers made of calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, or glass. The porous layer may contain (i) only one kind of filler or (ii) two or more kinds of fillers in combination.

Among the above fillers, a filler made of inorganic matter is suitable. A filler made of an inorganic oxide such as silica, calcium oxide, magnesium oxide, titanium oxide, alumina, mica, or zeolite is preferable. A filler made of at least one kind selected from the group consisting of silica, magnesium oxide, titanium oxide, and alumina is more preferable. A filler made of alumina is particularly preferable. While alumina has many crystal forms such as α-alumina, β-alumina, γ-alumina, and θ-alumina, any of the crystal forms can be used suitably. Among the above crystal forms, α-alumina is the most preferable because it is particularly high in thermal stability and chemical stability.

The porous layer may be formed by, for example, (i) a method of directly applying a coating solution containing the component for the porous layer and a medium (hereinafter also referred to simply as "coating solution") to a surface of the porous film and removing the solvent (disperse medium) from the coating solution, (ii) a method of applying the coating solution to an appropriate support, removing the solvent (disperse medium) from the coating solution to form a porous layer, pressure-bonding the porous layer and the porous film to each other, and peeling the support off, (iii) a method of applying the coating solution to a surface of an appropriate support, pressure-bonding the porous film to the surface of the support, peeling the support off, and removing the solvent (disperse medium) from the coating solution, or (iv) a method of immersing the porous film in the coating solution for dip coating and removing the solvent (disperse medium) from the coating solution.

The thickness of the porous layer may be controlled by adjusting, for example, (i) the thickness of a coating film in a wet state after the coating, (ii) the weight ratio of the resin and the filler, and/or (iii) the solid content concentration of the coating solution (that is, the sum of the resin concentration and the filler concentration). The support is, for example, a resin film, a metal belt, or a drum.

The coating solution may be applied to the porous film or support by any method that allows for, for example, a necessary weight per unit area and a necessary coating area. The coating solution may be applied by a conventionally publicly known method.

The solvent (disperse medium) is removed typically by a drying method. Examples of the drying method include natural drying, air-blowing drying, heat drying, and drying under reduced pressure. The solvent may, however, be removed by any method that allows the solvent (disperse medium) to be removed sufficiently. The drying method may involve use of a normal drying device.

The coating solution may be dried after the solvent (disperse medium) contained in the coating solution is replaced with another solvent. The solvent (disperse medium) may be replaced with another solvent for removal by, for example, a method of (i) preparing another solvent (hereinafter referred to as "solvent X") that dissolves the solvent (disperse medium) contained in the coating solution and that does not dissolve the resin contained in the coating solution, (ii) immersing the porous film or support, to which the coating solution has been applied and on which a coating film has been formed, into the solvent X to replace the solvent (disperse medium) in the coating film on the porous film or support with the solvent X, and (iii) evaporating the solvent X. This method allows the solvent (disperse medium) to be removed efficiently from the coating solution.

In a case where the coating film, formed on the porous film or support by applying the coating solution thereto, is heated to remove the solvent (disperse medium) or solvent X from the coating film, the coating film is desirably heated at a temperature that does not decrease the air permeability, specifically within a range of 10° C. to 120° C., preferably within a range of 20° C. to 80° C., to prevent pores in the porous film from contracting to decrease the air permeability of the porous film.

[2. Nonaqueous Electrolyte Secondary Battery Member and Nonaqueous Electrolyte Secondary Battery]

A nonaqueous electrolyte secondary battery member in accordance with an embodiment of the present invention includes (i) a cathode, (ii) a nonaqueous electrolyte secondary battery separator or nonaqueous electrolyte secondary battery laminated separator, and (iii) an anode, the cathode, the nonaqueous electrolyte secondary battery laminated separator, and the anode being arranged in this order. A nonaqueous electrolyte secondary battery in accordance with an embodiment of the present invention includes a nonaqueous electrolyte secondary battery separator or nonaqueous electrolyte secondary battery laminated separator. The description below deals with (i) a lithium ion secondary battery member as an example of the nonaqueous electrolyte secondary battery member and (ii) a lithium ion secondary battery as an example of the nonaqueous electrolyte secondary battery. Those elements of a nonaqueous electrolyte secondary battery member and nonaqueous electrolyte secondary battery which are other than the above nonaqueous electrolyte secondary battery separator and nonaqueous electrolyte secondary battery laminated separator are not limited to the elements described below.

The nonaqueous electrolyte secondary battery in accordance with an embodiment of the present invention may include, for example, a nonaqueous electrolyte solution prepared by dissolving a lithium salt in an organic solvent. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. The present embodiment may use (i) only one kind of the above lithium salts or (ii) two or more kinds of the above lithium salts in combination. The present embodiment preferably uses, among the above lithium salts, at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$.

Specific examples of the organic solvent in the nonaqueous electrolyte solution include carbonates such as ethylene carbonate, propylene carbonate, dimethyl carbonate, diethyl carbonate, ethyl methyl carbonate, 4-trifluoromethyl-1,3-dioxolane-2-on, and 1,2-di(methoxy carbonyloxy)ethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and fluorine-containing organic solvents each prepared by introducing a fluorine group into the organic solvent. The present embodiment may use (i) only one kind of the above organic solvents or (ii) two or more kinds of the above organic solvents in combination. Among the above organic solvents, carbonates are preferable. A mixed solvent of a cyclic carbonate and an acyclic carbonate or a mixed solvent of a cyclic carbonate and an ether is more preferable. The mixed solvent of a cyclic carbonate and an acyclic carbonate is preferably a mixed solvent of ethylene carbonate, dimethyl carbonate, and ethyl methyl carbonate because such a mixed solvent allows a wider operating temperature range, and is not easily decomposed even in a case where the present embodiment uses, as an anode active material, a graphite material such as natural graphite or artificial graphite.

The cathode is normally a sheet-shaped cathode including (i) a cathode mix containing a cathode active material, an electrically conductive material, and a binding agent and (ii) a cathode current collector supporting the cathode mix thereon.

The cathode active material is, for example, a material capable of being doped and dedoped with lithium ions. Specific examples of such a material include a lithium complex oxide containing at least one transition metal such as V, Mn, Fe, Co, or Ni. Among such lithium complex oxides, (i) a lithium complex oxide having an $\alpha$-NaFeO$_2$ structure such as lithium nickelate and lithium cobaltate and (ii) a lithium complex oxide having a spinel structure such as lithium manganese spinel are preferable because such lithium complex oxides have a high average discharge potential. The lithium complex oxide containing the at least one transition metal may further contain any of various metallic elements, and is more preferably complex lithium nickelate. Further, the complex lithium nickelate particularly preferably contains at least one metallic element selected from the group consisting of Ti, Zr, Ce, Y, V, Cr, Mn, Fe, Co, Cu, Ag, Mg, Al, Ga, In, and Sn at a proportion of 0.1 mol % to 20 mol % with respect to the sum of the number of moles of the at least one metallic element and the number of moles of Ni in the lithium nickelate. This is because such a complex lithium nickelate allows an excellent cycle characteristic in a case where it is used in a high-capacity battery. The active material particularly preferably contains Al or Mn, and contains Ni at a proportion of not less than 85%, further preferably not less than 90%. This is because a nonaqueous electrolyte secondary battery including a cathode containing such an active material has an excellent cycle characteristic in a case where the nonaqueous electrolyte secondary battery has a high capacity.

Examples of the electrically conductive material include carbonaceous materials such as natural graphite, artificial graphite, cokes, carbon black, pyrolytic carbons, carbon fiber, and a fired product of an organic polymer compound. The present embodiment may use (i) only one kind of the above electrically conductive materials or (ii) two or more kinds of the above electrically conductive materials in combination, for example, a mixture of artificial graphite and carbon black.

Examples of the binding agent include thermoplastic resins such as polyvinylidene fluoride, a copolymer of vinylidene fluoride, polytetrafluoroethylene, a vinylidene fluoride-hexafluoro propylene copolymer, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-tetrafluoroethylene copolymer, a vinylidene fluoride-trifluoro ethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and a thermoplastic polyimide, polyethylene, and polypropylene, as well as acrylic resin and styrene-butadiene-rubber. The binding agent functions also as a thickening agent.

The cathode mix may be prepared by, for example, a method of applying pressure to the cathode active material, the electrically conductive material, and the binding agent on the cathode current collector or a method of using an appropriate organic solvent so that the cathode active material, the electrically conductive material, and the binding agent are in a paste form.

The cathode current collector is, for example, an electric conductor such as Al, Ni, and stainless steel, among which Al is preferable because Al is easily processed into a thin film and is inexpensive.

The sheet-shaped cathode may be produced, that is, the cathode mix may be supported by the cathode current collector, by, for example, a method of applying pressure to the cathode active material, the electrically conductive material, and the binding agent on the cathode current collector to form a cathode mix thereon or a method of (i) using an appropriate organic solvent so that the cathode active material, the electrically conductive material, and the binding agent are in a paste form to provide a cathode mix, (ii) applying the cathode mix to the cathode current collector, (iii) drying the applied cathode mix to prepare a sheet-shaped cathode mix, and (iv) applying pressure to the sheet-shaped cathode mix so that the sheet-shaped cathode mix is firmly fixed to the cathode current collector.

The anode is normally a sheet-shaped anode including (i) an anode mix containing an anode active material and (ii) an anode current collector supporting the anode mix thereon. The sheet-shaped anode preferably contains the above-described electrically conductive material and binding agent.

The anode active material is, for example, (i) a material capable of being doped and dedoped with lithium ions, (ii) a lithium metal, or (iii) a lithium alloy. Specific examples of the material include carbonaceous materials such as natural graphite, artificial graphite, cokes, carbon black, pyrolytic carbons, carbon fiber, and a fired product of an organic polymer compound; chalcogen compounds such as an oxide and a sulfide that are doped and dedoped with lithium ions at an electric potential lower than that for the cathode; metals such as aluminum (Al), lead (Pb), tin (Sn), bismuth (Bi), and silicon (Si) which metals can be alloyed with an alkali metal; cubic-crystal intermetallic compounds into the lattice of which an alkali metal is insertable (for example, AlSb, Mg$_2$Si, and NiSi$_2$); and a lithium nitrogen compound such as Li$_3$-xM$_x$N (where M is a transition metal). Among the above anode active materials, a carbonaceous material containing a graphite material such as natural graphite or artificial graphite as a main component is preferable because such a carbonaceous material has high electric potential flatness and low average discharge potential, and can thus achieve a high energy density in combination with a cathode. The anode active material is more preferably a mixture of graphite and silicon with a Si content of not less than 5%, further preferably not less than 10%, with respect to C.

The anode mix may be prepared by, for example, a method of applying pressure to the anode active material on the anode current collector or a method of using an appropriate organic solvent so that the anode active material is in a paste form.

The anode current collector is, for example, Cu, Ni, or stainless steel, among which Cu is preferable because Cu is not easily alloyed with lithium in the case of a lithium ion secondary battery and is easily processed into a thin film.

The sheet-shaped anode may be produced, that is, the anode mix may be supported by the anode current collector, by, for example, a method of applying pressure to the anode active material on the anode current collector to form an anode mix thereon or a method of (i) using an appropriate organic solvent so that the anode active material is in a paste form to provide an anode mix, (ii) applying the anode mix to the anode current collector, (iii) drying the applied anode mix to prepare a sheet-shaped anode mix, and (iv) applying pressure to the sheet-shaped anode mix so that the sheet-shaped anode mix is firmly fixed to the anode current collector. The paste preferably contains the above-described conductive auxiliary agent and binding agent.

The nonaqueous electrolyte secondary battery in accordance with an embodiment of the present invention may be produced by (i) arranging the cathode, the nonaqueous electrolyte secondary battery separator or nonaqueous electrolyte secondary battery laminated separator, and the anode in that order to form a nonaqueous electrolyte secondary battery member in accordance with an embodiment of the present invention, (ii) inserting the nonaqueous electrolyte secondary battery member into a container for use as a housing of the nonaqueous electrolyte secondary battery, (iii) filling the container with a nonaqueous electrolyte solution, and (iv) hermetically sealing the container under reduced pressure. The nonaqueous electrolyte secondary battery may have any shape such as the shape of a thin plate (sheet), a disk, a cylinder, or a prism such as a cuboid. The nonaqueous electrolyte secondary battery may be produced by any method, and may be produced by a conventionally publicly known method.

EXAMPLES

The following description will discuss an embodiment of the present invention in greater detail on the basis of Examples. The present invention is, however, not limited to the Examples.

<Method for Measuring Various Physical Properties>

Various physical properties of nonaqueous electrolyte secondary battery separators (porous films) of the Examples and Comparative Examples below were measured by the methods below.

(1) Film Thickness

The thickness D (μm) of each porous film was measured in conformity with a JIS standard (K7130-1992).

(2) Weight Per Unit Area

A square with each side having a length of 10 cm was cut out from each porous film, and its weight W (g) was measured. Then, the weight per unit area of the porous film was calculated on the basis of the following formula:

Weight per unit area $(g/m^2) = W/(0.1 \times 0.1)$.

(3) Porosity

The porosity (% by volume) of each porous film was calculated from the film thickness D (μm) and the weight W (g) on the basis of the following formula:

Porosity (% by volume) = $(1-(W/\text{specific gravity})/(10 \times 10 \times D/10000)) \times 100$ (4) Air Permeability The air permeability of each porous film was measured in conformity with JIS P8117 with use of a Gurley-type densometer (produced by Toyo Seiki Seisaku-sho Ltd.) equipped with a digital timer.

(5) DSC Measurement

Measurement samples were prepared by the methods (a), (b), and (c) below, and a DSC measurement was made of each of the measurement samples with use of DSC-7020 (produced by Seiko Instruments Inc.) with a temperature rise rate of 10° C./min.

(a) An aluminum pan (with a ϕ of 5 mm) was charged with a stack of 17 porous films cut out to have a size of 3 mm×3 mm. An aluminum lid was placed on the aluminum pan, and was caulked with use of a caulking jig. This prepared a measurement sample.

(b) A porous film was cut out into the shape of a strip (with a width of 3 mm and a length of 50 mm) having a longitudinal direction along the MD direction. The porous film was wound around an aluminum plate (with a length of 5 mm, a width of 1.5 mm, and a thickness of 0.1 mm) under tension to prevent the porous film from becoming loose. The porous film was wound in such a manner that the width direction of the strip-shaped porous film was parallel to the longitudinal direction of the aluminum plate and that the number of turns was 14 to 16 after the winding was completed. A redundant portion of the aluminum plate (that is, a portion extending beyond the porous film) was cut off. The porous film wound around the remaining aluminum plate was put in an aluminum pan (with a ϕ of 5 mm). An aluminum lid was placed on the porous film, and was caulked with use of a caulking jig. This prepared a measurement sample. An aluminum plate identical in shape to the aluminum plate included in the measurement sample was also included in a reference cell.

(c) A porous film was cut out into the shape of a strip (with a width of 3 mm and a length of 50 mm) having a longitudinal direction along the TD direction. The porous film was wound around an aluminum plate (with a length of 5 mm, a width of 1.5 mm, and a thickness of 0.1 mm) under tension to prevent the porous film from becoming loose. The porous film was wound in such a manner that the width direction of the strip-shaped porous film was parallel to the longitudinal direction of the aluminum plate and that the number of turns was 14 to 16 after the winding was completed. A redundant portion of the aluminum plate (that is, a portion extending beyond the porous film) was cut off. The porous film wound around the remaining aluminum plate was put in an aluminum pan (with a ϕ of 5 mm). An aluminum lid was placed on the porous film, and was caulked with use of a caulking jig. This prepared a measurement sample. An aluminum plate identical in shape to the aluminum plate included in the measurement sample was also included in a reference cell.

The measurements of the measurement samples (a) to (c) provided DSC curves (horizontal axis: temperature, vertical axis: DSC [W/g]), from which $S_m$, $S_{MD}$, and $S_{TD}$ below were calculated.

$S_m$: Area surrounded by the baseline and the DSC curve for (a)

$S_{MD}$: Area of a portion at which the portion surrounded by the baseline and the DSC curve for (a) overlaps the portion surrounded by the baseline and the DSC curve for (b)

$S_{TD}$: Area of a portion at which the portion surrounded by the baseline and the DSC curve for (a) overlaps the portion surrounded by the baseline and the DSC curve for (c)

(6) Leak Defectiveness

A piece of sandpaper #1000 was folded into two, between which a porous film was held. A column with a diameter of 25 mm was placed on the sandpaper. A weight (4 kg with the column and the weight combined) was placed on the column for 10 seconds. An electrode with a diameter of 25 mm (500 g) for a withstand voltage tester (IMP3800 (produced by Nippon Technart Inc.)) was placed on a pressure application portion of the porous film, and the breakdown voltage was measured. A similar operation was carried out 9 times. The number of operations in which the breakdown voltage was not more than 0.9 kV was recorded as leak defectiveness.

<Preparation of Nonaqueous Electrolyte Secondary Battery Separator>

Porous films for Examples 1 and 2 and Comparative Examples 1 through 4 were prepared as described below for use as nonaqueous electrolyte secondary battery separators.

Example 1

Ultra-high molecular weight polyethylene powder (GUR4012 [produced by Ticona Corporation]) and polyethylene wax having a weight-average molecular weight of 1000 (FNP-0115 [produced by Nippon Seiro Co., Ltd.]) were prepared. To the combination (100 parts by weight) of the ultra-high molecular weight polyethylene powder (80 weight %) and the polyethylene wax (20 weight %), 0.4 weight % of an antioxidant (Irg1010 [produced by CIBA Specialty Chemicals Inc.]), 0.1 weight % of another antioxidant (P168 [produced by CIBA Specialty Chemicals Inc.]), and 1.3 weight % of sodium stearate were added. Further, calcium carbonate having an average pore size of 0.1 µm (produced by Maruo Calcium Co., Ltd.) was added at 37% by volume with respect to the total volume. These ingredients were mixed in a Henschel mixer in the form of powder, and were then melted and kneaded in a twin screw kneading extruder. This prepared a polyolefin resin composition.

The polyolefin resin composition was rolled with use of a pair of rolls each having a surface temperature of 147° C. This prepared a sheet having a thickness of approximately 54 µm. This sheet was immersed in a hydrochloric acid aqueous solution (containing 4 mol/L of hydrochloric acid and 0.5% by weight of a nonionic surfactant) for removal of the calcium carbonate. Then, the sheet was stretched in the TD direction at 105° C. 5.8 times to provide a porous film. Table 1 shows the conditions for the porous film production. Table 2 shows the physical properties of the porous film produced. Table 3 shows the DSC measurement result and leak defectiveness.

Example 2

Ultra-high molecular weight polyethylene powder (GUR4012 [produced by Ticona Corporation]) and polyethylene wax having a weight-average molecular weight of 1000 (FNP-0115 [produced by Nippon Seiro Co., Ltd.]) were prepared. To the combination (100 parts by weight) of the ultra-high molecular weight polyethylene powder (80 weight %) and the polyethylene wax (20 weight %), 0.4 weight % of an antioxidant (Irg1010 [produced by CIBA Specialty Chemicals Inc.]), 0.1 weight % of another antioxidant (P168 [produced by CIBA Specialty Chemicals Inc.]), and 1.3 weight % of sodium stearate were added. Further, calcium carbonate having an average pore size of 0.1 µm (produced by Maruo Calcium Co., Ltd.) was added at 41% by volume with respect to the total volume. These ingredients were mixed in a Henschel mixer in the form of powder, and were then melted and kneaded in a biaxial kneading machine. This prepared a polyolefin resin composition.

The polyolefin resin composition was rolled with use of a pair of rolls each having a surface temperature of 150° C. This prepared a sheet having a thickness of approximately 54 µm. This sheet was immersed in a hydrochloric acid aqueous solution (containing 4 mol/L of hydrochloric acid and 0.5% by weight of a nonionic surfactant) for removal of the calcium carbonate. Then, the sheet was stretched in the TD direction at 105° C. 5.8 times to provide a porous film. Table 1 shows the conditions for the porous film production. Table 2 shows the physical properties of the porous film produced. Table 3 shows the DSC measurement result and leak defectiveness.

Comparative Example 1

An operation similar to Example 1 of Japanese Patent Application Publication, Tokukai, No. 2011-032446 A was carried out except that the sheet thickness was 54 µm. This produced a porous film. Table 1 shows the conditions for the porous film production. Table 2 shows the physical properties of the porous film produced. Table 3 shows the DSC measurement result and leak defectiveness.

Comparative Example 2

Ultra-high molecular weight polyethylene powder (GUR4012 [produced by Ticona Corporation]) and polyethylene wax having a weight-average molecular weight of 1000 (FNP-0115 [produced by Nippon Seiro Co., Ltd.]) were prepared. To the combination (100 parts by weight) of the ultra-high molecular weight polyethylene powder (80 weight %) and the polyethylene wax (20 weight %), 0.4 weight % of an antioxidant (Irg1010 [produced by CIBA Specialty Chemicals Inc.]), 0.1 weight % of another antioxidant (P168 [produced by CIBA Specialty Chemicals Inc.]), and 1.3 weight % of sodium stearate were added. Further, calcium carbonate having an average pore size of 0.1 µm (produced by Maruo Calcium Co., Ltd.) was added at 37% by volume with respect to the total volume. These ingredients were mixed in a Henschel mixer in the form of powder, and were then melted and kneaded in a biaxial kneading machine. This prepared a polyolefin resin composition.

The polyolefin resin composition was rolled with use of a pair of rolls each having a surface temperature of 143° C. This prepared a sheet having a thickness of approximately 54 µm. This sheet was immersed in a hydrochloric acid aqueous solution (containing 4 mol/L of hydrochloric acid and 0.5% by weight of a nonionic surfactant) for removal of the calcium carbonate. Then, the sheet was stretched in the TD direction at 105° C. 5.8 times to provide a porous film. Table 1 shows the conditions for the porous film production. Table 2 shows the physical properties of the porous film produced. Table 3 shows the DSC measurement result and leak defectiveness.

Comparative Example 3

Ultra-high molecular weight polyethylene powder (GUR4012 [produced by Ticona Corporation]) and polyethylene wax having a weight-average molecular weight of 1000 (FNP-0115 [produced by Nippon Seiro Co., Ltd.]) were prepared. To the combination (100 parts by weight) of the ultra-high molecular weight polyethylene powder (80 weight %) and the polyethylene wax (20 weight %), 0.4 weight % of an antioxidant (Irg1010 [produced by CIBA Specialty Chemicals Inc.]), 0.1 weight % of another antioxidant (P168 [produced by CIBA Specialty Chemicals Inc.]), and 1.3 weight % of sodium stearate were added. Further, calcium carbonate having an average pore size of 0.1 μm (produced by Maruo Calcium Co., Ltd.) was added at 37% by volume with respect to the total volume. These ingredients were mixed in a Henschel mixer in the form of powder, and were then melted and kneaded in a biaxial kneading machine. This prepared a polyolefin resin composition.

The polyolefin resin composition was rolled with use of a pair of rolls each having a surface temperature of 147° C. This prepared a sheet having a thickness of approximately 30 μm. This sheet was immersed in a hydrochloric acid aqueous solution (containing 4 mol/L of hydrochloric acid and 0.5% by weight of a nonionic surfactant) for removal of the calcium carbonate. Then, the sheet was stretched in the TD direction at 105° C. 4.0 times to provide a porous film. Table 1 shows the conditions for the porous film production. Table 2 shows the physical properties of the porous film produced. Table 3 shows the DSC measurement result and leak defectiveness.

TABLE 1

| | Amount of calcium carbonate (% by volume) | Rolling film thickness (μm) | Roll temperature for rolling (° C.) | Stretching magnification |
|---|---|---|---|---|
| Example 1 | 37 | 54 | 147 | 5.8 |
| Example 2 | 41 | 54 | 150 | 5.8 |
| Comparative Example 1 | 37 | 54 | 150 | 5.8 |
| Comparative Example 2 | 37 | 54 | 143 | 5.8 |
| Comparative Example 3 | 37 | 40 | 147 | 4.0 |

TABLE 2

| | Film thickness (μm) | Weight per unit area (g/m²) | Porosity (%) | Air permeability (sec/100 cc) |
|---|---|---|---|---|
| Example 1 | 12.0 | 6.0 | 47 | 167 |
| Example 2 | 11.6 | 5.8 | 47 | 104 |
| Comparative Example 1 | 11.5 | 5.7 | 48 | 102 |
| Comparative Example 2 | 13.3 | 5.7 | 54 | 114 |
| Comparative Example 3 | 12.3 | 5.4 | 54 | 78 |

TABLE 3

| | $S_{MD}/S_m$ | $S_{TD}/S_m$ | Average | Leak defectiveness |
|---|---|---|---|---|
| Example 1 | 0.90 | 0.82 | 0.86 | 1 |
| Example 2 | 0.91 | 0.89 | 0.90 | 3 |
| Comparative Example 1 | 0.97 | 0.88 | 0.93 | 9 |
| Comparative Example 2 | 0.79 | 0.88 | 0.84 | 5 |
| Comparative Example 3 | 0.90 | 0.95 | 0.93 | 7 |

Table 2 shows the following: The respective porous films of Examples 1 and 2 and Comparative Examples 1 through 3 each had (i) a thickness within a range of 3 μm to 16 μm for a higher energy density and (ii) an air permeability with a Gurley value within a range of 50 sec/100 cc to 200 sec/100 cc for a sufficient ion permeability. The respective porous films of Examples 1 and 2, each of which had such a thickness and ion permeability, had a mean value of $S_{MD}/S_m$ and $S_{TD}/S_m$ $(=((S_{MD}/S_m)+(S_{TD}/S_m))/2)$ within a range of 0.85 to 0.91 and a leak defectiveness of not more than 3, indicative of a low frequency of occurrence of a leak defect. In contrast, the porous film of Comparative Example 2, which had a mean value of $S_{MD}/S_m$ and $S_{TD}/S_m$ of less than 0.85, and the respective porous films of Comparative Examples 1 and 3, each of which had a mean value of $S_{MD}/S_m$ and $S_{TD}/S_m$ of more than 0.91, each had a leak defectiveness of not less than 5, indicative of a high frequency of occurrence of a leak defect.

Figure 3:
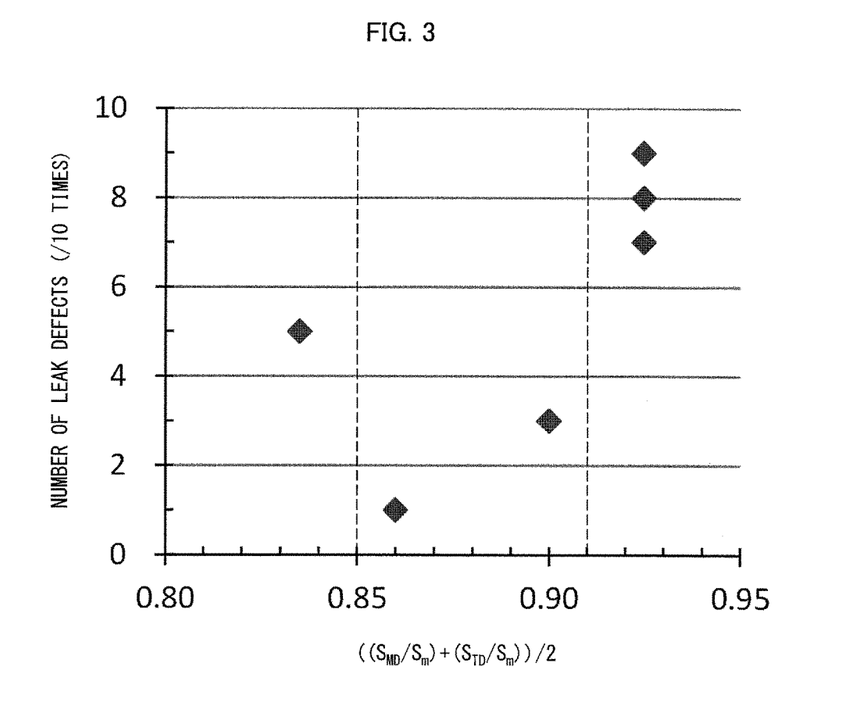
FIG. 3 is a graph that shows a relationship between the mean value of $S_{MD}/S_m$ and $S_{TD}/S_m$ and leak defectiveness in Examples and Comparative Examples.

FIG. 3 is a graph that shows a relationship between the mean value of $S_{MD}/S_m$ and $S_{TD}/S_m$ and the leak defectiveness. FIG. 3 shows reduced leak defectiveness within a range of the mean value of 0.85 to 0.91.

The invention claimed is:

1. A nonaqueous electrolyte secondary battery separator comprising a porous film containing polyolefin in an amount of not less than 50% by volume,
    the nonaqueous electrolyte secondary battery separator having a Gurley value within a range of 50 sec/100 cc to 200 sec/100 cc,
    the nonaqueous electrolyte secondary battery separator having a thickness within a range of 3 μm to 16 μm,
    the nonaqueous electrolyte secondary battery separator satisfying Formula (1) below:

$$0.85 \leq ((S_{MD}/S_m)+(S_{TD}/S_m))/2 \leq 0.91 \qquad \text{Formula (1),}$$

where
    $S_m$ is an area of a peak of a sheet-stack DSC curve, which is a DSC curve that shows a result of measurement for a stack of pieces each cut out from the porous film and having a predetermined size,
    $S_{MD}$ is an area of a portion at which the peak of the sheet-stack DSC curve overlaps a peak of a DSC curve that shows a result of measurement for a sample that has been (i) cut out from the porous film into a shape of a strip having a length of 50 mm and a longitudinal direction along an MD direction and (ii) wound around an aluminum plate having a width of 1.5 mm and a thickness of 0.1 mm so as to have 14 to 16 turns, and
    $S_{TD}$ is an area of a portion at which the peak of the sheet-stack DSC curve overlaps a peak of a DSC curve that shows a result of measurement for a sample that has been (i) cut out from the porous film into a shape of a strip having a length of 50 mm and a longitudinal direction along a TD direction and (ii) wound around an aluminum plate having a width of 1.5 mm and a thickness of 0.1 mm so as to have 14 to 16 turns.

2. A nonaqueous electrolyte secondary battery member, comprising:
    a cathode;
    a nonaqueous electrolyte secondary battery separator according to claim 1; and
    an anode,
    the cathode, the nonaqueous electrolyte secondary battery separator, and the anode being arranged in this order.

3. A nonaqueous electrolyte secondary battery, comprising:

a nonaqueous electrolyte secondary battery separator according to claim 1.

4. A nonaqueous electrolyte secondary battery laminated separator, comprising:
a nonaqueous electrolyte secondary battery separator according to claim 1; and
a porous layer.

5. A nonaqueous electrolyte secondary battery member, comprising:
a cathode;
a nonaqueous electrolyte secondary battery laminated separator according to claim 4; and
an anode,
the cathode, the nonaqueous electrolyte secondary battery laminated separator, and the anode being arranged in this order.

6. A nonaqueous electrolyte secondary battery, comprising:
a nonaqueous electrolyte secondary battery laminated separator according to claim 4.

* * * * *